United States Patent
Nettelmann et al.

(10) Patent No.: US 7,937,205 B2
(45) Date of Patent: May 3, 2011

(54) METHOD FOR CONTROLLING THE FUNCTIONS OF AN ELECTRONIC DRIVING STABILITY PROGRAM FOR A MOTOR VEHICLE

(75) Inventors: Marc Nettelmann, Garbsen (DE); Jörg Grotendorst, Garbsen (DE)

(73) Assignee: Continental Aktiengesellschaft, Hannover (DE)

( * ) Notice: Subject to any disclaimer, the term of this patent is extended or adjusted under 35 U.S.C. 154(b) by 970 days.

(21) Appl. No.: 10/581,847

(22) PCT Filed: Nov. 4, 2004

(86) PCT No.: PCT/EP2004/052793
§ 371 (c)(1),
(2), (4) Date: May 11, 2007

(87) PCT Pub. No.: WO2005/054024
PCT Pub. Date: Jun. 16, 2005

(65) Prior Publication Data
US 2008/0051956 A1    Feb. 28, 2008

(30) Foreign Application Priority Data
Dec. 3, 2003  (DE) .................................. 103 56 378

(51) Int. Cl.
*G05D 1/08*  (2006.01)
*G06F 7/00*  (2006.01)
(52) U.S. Cl. .......................................... 701/91; 701/48
(58) Field of Classification Search .................... 701/48, 701/73, 76, 80, 91
See application file for complete search history.

(56) References Cited

U.S. PATENT DOCUMENTS

| | | | | |
|---|---|---|---|---|
| 4,923,210 A * | 5/1990 | Heider et al. | ............... | 280/6.153 |
| 5,113,345 A * | 5/1992 | Mine et al. | ...................... | 701/38 |
| 5,253,931 A | 10/1993 | Köster et al. | | |
| 6,202,009 B1 * | 3/2001 | Tseng | .............. | 701/34 |
| 6,260,859 B1 * | 7/2001 | Dixon et al. | ............... | 280/5.514 |
| 6,312,066 B1 | 11/2001 | Gronau et al. | | |
| 6,491,307 B1 * | 12/2002 | Charzinski et al. | ........ | 280/5.508 |
| 6,684,140 B2 * | 1/2004 | Lu | .................... | 701/37 |
| 6,935,625 B2 * | 8/2005 | Bolt et al. | ................. | 267/64.16 |
| 6,937,928 B2 * | 8/2005 | Capito | ............................ | 701/37 |
| 6,954,691 B2 * | 10/2005 | Roll et al. | ....................... | 701/70 |
| 6,961,648 B2 * | 11/2005 | Salib et al. | ....................... | 701/70 |
| 7,063,333 B2 * | 6/2006 | van Cayzeele et al. | ..... | 280/5.501 |
| 7,096,103 B2 * | 8/2006 | Salib et al. | ...................... | 701/38 |
| 7,120,528 B2 * | 10/2006 | Salib et al. | ...................... | 701/45 |
| 7,571,044 B2 * | 8/2009 | Brown et al. | .................. | 701/91 |
| 7,668,645 B2 * | 2/2010 | Lu et al. | ....................... | 701/124 |

(Continued)

FOREIGN PATENT DOCUMENTS

DE           10205229           8/2003

(Continued)

*Primary Examiner* — Khoi Tran
*Assistant Examiner* — Jason Holloway
(74) *Attorney, Agent, or Firm* — Brinks Hofer Gilson & Lione

(57) ABSTRACT

In order to ensure problem-free operation of a vehicle when a wedge of material is formed between the roadway and the vehicle, a method for controlling the functions of an electronic driving stability program automatically activates or deactivates the driving stability program of the vehicle according to the respective operational situation of the motor vehicle. The driving stability program is automatically deactivated when the vehicle drives onto a wedge of material on the roadway. A determination whether the vehicle drives onto a wedge of material on the roadway is made by means of the air springs of the vehicle and associated distance sensor and/or pressure sensors.

9 Claims, 1 Drawing Sheet

U.S. PATENT DOCUMENTS

| | | | |
|---|---|---|---|
| 7,729,829 B2 * | 6/2010 | Messih et al. | 701/37 |
| 2002/0038193 A1 * | 3/2002 | Grunberg et al. | 702/173 |
| 2003/0139861 A1 * | 7/2003 | Cayzeele et al. | 701/36 |
| 2003/0191572 A1 * | 10/2003 | Roll et al. | 701/70 |
| 2004/0024505 A1 * | 2/2004 | Salib et al. | 701/38 |
| 2004/0117085 A1 * | 6/2004 | Lu et al. | 701/36 |
| 2005/0256628 A1 * | 11/2005 | Salib et al. | 701/70 |

FOREIGN PATENT DOCUMENTS

EP            0425810      5/1991

* cited by examiner

METHOD FOR CONTROLLING THE FUNCTIONS OF AN ELECTRONIC DRIVING STABILITY PROGRAM FOR A MOTOR VEHICLE

BACKGROUND OF THE INVENTION

The invention relates to a method for controlling the functions of an electronic driving stability program for a motor vehicle according to the preamble of patent claim 1.

German patent applications DE 199 36 439 A1 and DE 100 34 723 A1 disclose that an electronic driving stability program (ESP) which is effective in a motor vehicle can ensure that the driver maintains control over his motor vehicle if the latter threatens to leave its lane due to pronounced steering movements, pronounced deceleration of the vehicle and/or adverse weather conditions. To do this, an ESP computer uses sensors and this driving stability program to monitor the driving state of the motor vehicle and the steering behavior of the driver. By selectively activating the service brake at individual wheels of the vehicle and, if appropriate, reducing the power of the engine, the driving stability program stabilizes the motor vehicle and thus avoids uncontrolled movements of the vehicle.

In addition it is known that vehicles which are equipped with such a driving stability program generally have an electrical switch whose activation allows the driving stability program to be activated or deactivated. In the case of snow and ice on the road, for example, it may be appropriate to prevent the control intervention by such a driving stability program. In particular when the properties of the underlying surface change the driver of the vehicle is required to activate or deactivate the driving stability program in a way which is appropriate for the driving situation.

Furthermore, in the winter mode of the vehicle with an electronic driving stability program what is referred to as a snow wedge may build up between the underlying surface and the bottom of the vehicle or the vehicle wheels. Such a snow wedge is produced, for example, as a result of snow being pushed together essentially in parallel with the underlying surface or as a result of the vehicle wheels sinking into a comparatively deep layer of snow and compacting the snow. At the same time, wedges can also be produced from other roadway materials such as sand, grit stones, branches, etc. The wedge of roadway material may affect one wheel of the vehicle or a corner of the vehicle or an axle of the vehicle or the entire front or rear side of the vehicle.

A disadvantage with respect to the method of functioning of an electronic driving stability program in such a driving situation is the fact that a vehicle wheel which is affected by the wedge of roadway material may be braked and may thus only transmit reduced driving torque, or even no driving torque at all, to the underlying surface in a way which is effective in terms of drive. This state is detected by the driving stability program so that the latter acts, for example, on the axially opposite vehicle wheel by selective brake intervention and reduces the ability of said wheel to transmit torque to the carriageway in such a way that a rotational movement of the vehicle about its vertical axis does not occur.

At a low initial speed of the vehicle, this can ultimately lead to the vehicle coming to a standstill, and when the driving stability program is switched on it is not possible for the driver to "cut through" the respective wedge of roadway material, or move it away in some other way, with spinning vehicle wheels, for example.

Furthermore, driving of a vehicle with a ride level control system onto a wedge of roadway material can lead to said system causing one side of the bodywork of the vehicle to be lowered or raised as a result of the wedge in order to compensate for the oblique position which is sensed, as a result of which the bottom side of the floor of the vehicle comes to rest on the wedge of roadway material over a large area or the affected front side or rear side of the vehicle is raised in its entirety in order to equalize the level.

In order to avoid the aforesaid disadvantages, the object of the invention is to propose a method for controlling the functions of an electronic driving stability program with which it is ensured that a motor vehicle will operate in a way which is compatible for the driving situation even when a wedge of roadway material is formed in front of the wheels of the vehicle or between the floor of the vehicle and the underlying surface.

SUMMARY OF THE INVENTION

This object is achieved by determining through the air spring control device if at least one of the two conditions applies: the vehicle is driven on a wedge of roadway material; the vehicle is in a lifted platform situation; generating a deactivation signal if it is determined that at least one of the two conditions applies, and deactivating the driving stability program in response to the deactivation signal.

DETAILED DESCRIPTION OF THE DRAWING

Figure 1:
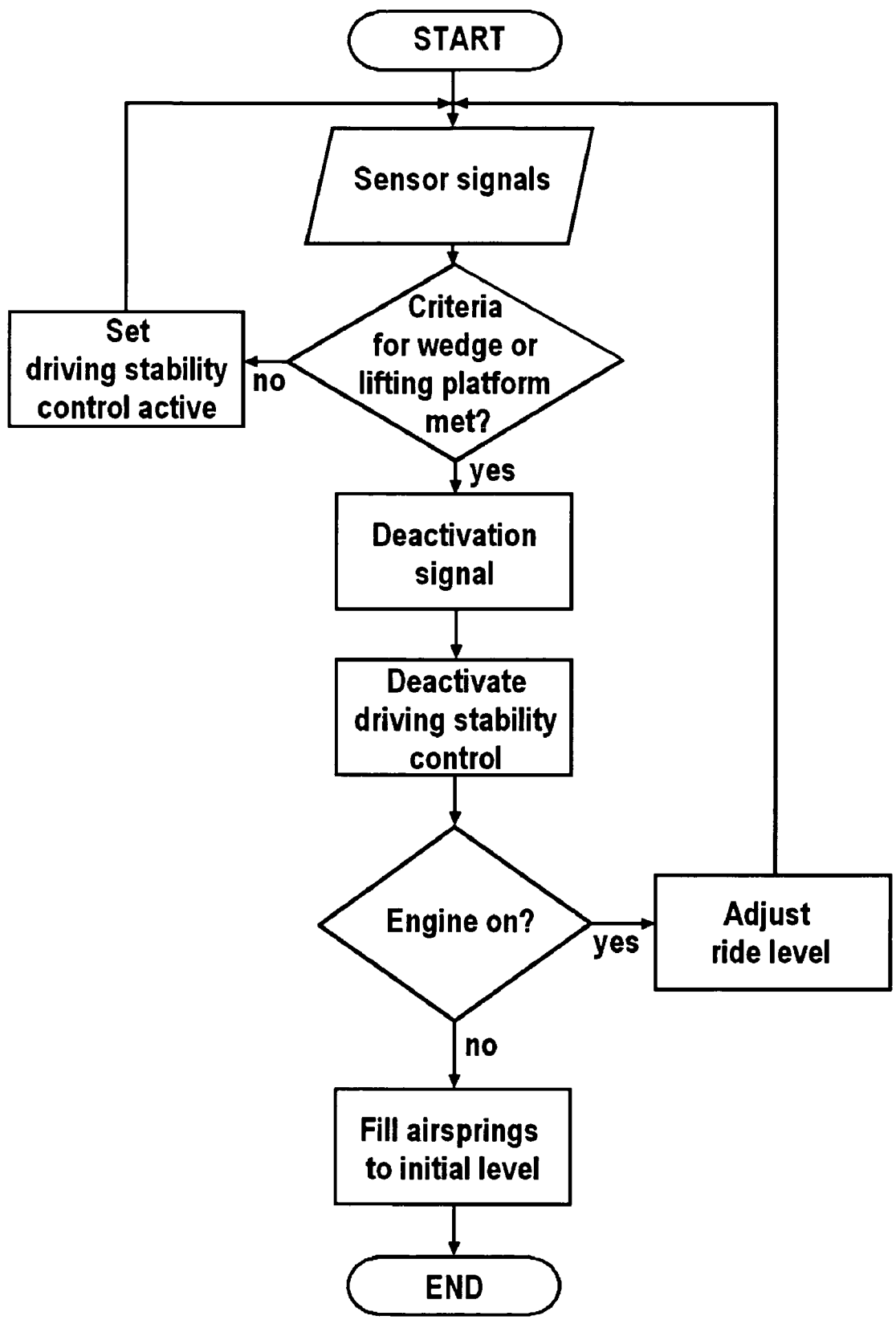
FIG. 1 shows a flow chart of the method according to the present invention.

According to the above, the invention provides a method for controlling the functions of an electronic driving stability program for a motor vehicle which is characterized in that said driving stability program is automatically activated or deactivated according to the operational situation of the motor vehicle, an activated driving stability program being switched off automatically if the vehicle is driven onto a wedge of roadway material.

The term "operational situation" includes in the context of the invention described here all situations in which a vehicle is used so that a driving stability program is, according to the invention, also deactivated directly after the vehicle is activated, for example by the customary turning of an ignition key in an ignition lock, or remains deactivated if the vehicle is driven onto a wedge of roadway material which disrupts the operation of the vehicle.

In addition, it is part of the invention that the driving stability program is activated automatically again after automatic deactivation if there is no longer any disruptive wedge of roadway material between the vehicle and the underlying surface.

The autonomous method of functioning which is presented makes it possible to bring about a situation in which the driver is no longer distracted, as in the past, from his main tasks when operating the vehicle as a result of the driving stability program being activated or deactivated according to requirements.

In conjunction with this invention it is pointed out that the method according to the invention takes into account such instances of disruptive contact with a wedge of roadway material which are composed of loose roadway materials which can however be compacted under pressure, such as snow, sand, grit etc., or else materials which can be pushed together, such as, for example, stones and branches.

In an advantageous development of the invention it is possible to provide for pressure sensors on the air springs of the vehicle to be used to detect the vehicle driving onto a wedge of roadway material, and/or distance sensors to be used to determine the distance from the bottom of the vehicle or the wheel axle to the underlying surface.

In this context it is considered advantageous if the electronic driving stability program interacts with a ride level control program which is suitable for detecting a situation in which the motor vehicle is raised on a lifting platform (lifting platform situation).

An air spring control device and sensors assigned to it are preferably used to detect a lifting platform situation or to detect a wedge of roadway material between the vehicle and the underlying surface.

According to the method, in this context the presence of a lifting platform situation or of a wedge of roadway material is detected if, when the air spring is vented, the distance between the bottom of the vehicle and the underlying surface and/or the distance between at least one wheel axle and a vehicle wheel and the bottom of the vehicle exceeds a predefined set point value.

In order to improve the determination of the abovementioned operational situations of the vehicle further it is also possible to provide that the presence of a lifting platform situation or the presence of disruptive contact with a wedge of roadway material is not inferred until the aforesaid criteria last for longer than a predefined time period.

As soon as a lifting platform situation or a wedge of roadway material has been detected, the air spring control device generates appropriate signals for deactivating or activating the driving stability program and passes them onto a driving stability control device. However, it is also possible to provide for the driving stability control functions and air spring control functions to be operated by a common control device according to predefined electronic programs.

If a lifting platform situation is then detected, the invention provides for the air springs to be filled with compressed air again to an initial level and for any adjustment of the ride level compensation device to be prohibited as long as the drive engine of the vehicle is switched off.

In the case in which a wedge of roadway material which disrupts the driving operation is detected between the roadway and the vehicle, adjustment of the ride level compensation device is permitted, for example, in order to increase the distance from the bottom of the vehicle to the underlying surface if the drive engine of the vehicle is switched on. As a result, despite the detected oblique position owing to the wedge of roadway material the vehicle can be adjusted to a comparatively horizontal position using the air springs on the vehicle wheels. The automatic deactivation of the driving stability program which also takes place then allows the vehicle to advantageously travel through the wedge of roadway material which is formed, for example, as a wedge of snow.

The invention claimed is:

1. A method for controlling the functions of an electronic driving stability program for a motor vehicle with air springs, with an air spring control device, and with a body and at least two wheeled axles, the method comprising the steps of
   determining through the air spring control device if at least one of the following two conditions applies: at least one of the wheeled axles is driven on a wedge of accumulated roadway material; the vehicle is in a lifted platform situation in which the vehicle's weight is supported by the vehicle body and at most one axle;
   generating a deactivation signal if it is determined that at least one of the two conditions applies, and
   deactivating the driving stability program in response to the deactivation signal, wherein the determination of whether at least one of the two conditions applies is carried out by means of distance sensors and wherein a deactivation signal is generated for a given wheel when an associated air spring is not pressurized and the distance between the bottom of the vehicle and at least one member of the group consisting of an underlying surface, the wheel axle associated with the vehicle wheel, and the vehicle wheel itself, exceeds a predefined set point value.

2. The method according to claim 1, wherein at least one of the conditions is determined if the predefined set point value is exceeded for longer than a predefined time period.

3. The method according to claim 1, comprising the additional step of re-activating the driving stability program automatically after the deactivation if it is determined that the vehicle is no longer in contact with the wedge of roadway material.

4. A method for controlling the functions of an electronic driving stability program for a motor vehicle with air springs, with an air spring control device, and with a body and at least two wheeled axles, the method comprising the steps of
   determining through the air spring control device if at least one of the following two conditions applies: at least one of the wheeled axles is driven on a wedge of accumulated roadway material; the vehicle is in a lifted platform situation in which the vehicle's weight is supported by the vehicle body and at most one axle;
   generating a deactivation signal if it is determined that at least one of the two conditions applies, and
   deactivating the driving stability program in response to the deactivation signal, wherein the determination of a lifting platform situation is carried out in connection with a ride level compensation device performing a ride level control method which is suitable for detecting a situation in which the motor vehicle is raised on a lifting platform.

5. The method according to claim 4, wherein the determination of whether at least one of the two conditions applies is carried out by means of pressure sensors in the air springs.

6. The method according to claim 5, wherein the determination of whether the vehicle is driven on a wedge of roadway material is carried out by detecting a disruptive contact between the vehicle and the roadway material.

7. The method according to claim 4 for a vehicle with a drive engine, further comprising the steps of filling the air springs with compressed air to an initial level when a lifting platform situation is detected, and prohibiting any adjustment of the ride level compensation device if the drive engine of the vehicle is switched off.

8. The method according to claim 7, wherein an adjustment of the ride level compensation device, which causes the distance from the bottom of the vehicle to the underlying surface to become larger, is permitted.

9. The method according to claim 8 for a vehicle with a drive engine, wherein, after disruptive contact with a wedge of roadway material has been detected, an adjustment of the ride level compensation device is permitted if the drive engine of the vehicle is switched on.

* * * * *